United States Patent
Ishii et al.

(10) Patent No.: US 6,847,482 B2
(45) Date of Patent: Jan. 25, 2005

(54) IMAGE-ERECTING VIEWING OPTICAL SYSTEM

(75) Inventors: Shinichiro Ishii, Saitama (JP); Satoru Nemoto, Saitama (JP)

(73) Assignee: PENTAX Corporation, Tokyo (JP)

( * ) Notice: Subject to any disclaimer, the term of this patent is extended or adjusted under 35 U.S.C. 154(b) by 121 days.

(21) Appl. No.: 10/307,352

(22) Filed: Dec. 2, 2002

(65) Prior Publication Data

US 2003/0107801 A1 Jun. 12, 2003

(30) Foreign Application Priority Data

Dec. 4, 2001 (JP) ........................................ 2001-370584

(51) Int. Cl.$^7$ ............................................. G02B 23/00
(52) U.S. Cl. ..................... 359/431; 359/834; 396/382; 396/384
(58) Field of Search ................................. 359/401, 422, 359/425, 431, 432, 740, 833, 834, 836; 396/382, 384

(56) References Cited

U.S. PATENT DOCUMENTS

| | | | |
|---|---|---|---|
| 5,640,632 A | | 6/1997 | Koyama et al. |
| 6,094,315 A | * | 7/2000 | Aoki ........................ 359/731 |
| 6,157,483 A | | 12/2000 | Watanabe |
| 6,384,969 B1 | | 5/2002 | Kanai et al. |

FOREIGN PATENT DOCUMENTS

JP      10282422      10/1998

* cited by examiner

*Primary Examiner*—Mark A. Robinson
(74) *Attorney, Agent, or Firm*—Greenblum & Bernstein, P.L.C.

(57) ABSTRACT

An image-erecting viewing optical system includes a first prism having an incident surface and at least two reflection surfaces, a front lens group of an objective optical system, a second prism having an incident surface and at least two reflection surfaces, a rear lens group of the objective optical system, a field stop, and an eyepiece optical system, in this order from the object. One reflection surface of the first or second prism includes a roof-mirror surface. The following conditions are satisfied:

$$\sin(\theta-\omega')>1/n \quad (1)$$

$$6°<\omega<16° \quad (2)$$

wherein

θ designates an angle between the incident surface and the first reflection surface of the first prism;
ω designates a real field-of-view ω (half amount);
ω' designates an angle between a light ray of a real field-of-view ω (half amount) and the optical axis within the first prism; and
n designates the refractive index of the first prism.

2 Claims, 9 Drawing Sheets

Fig.9A
ER=3.0

— d Line
······ g Line
····· C Line

-2.0  2.0
SPHERICAL
ABERRATION
CHROMATIC
ABERRATION

Fig.9B
B=33.9

-0.2  0.2
LATERAL
CHROMATIC
ABERRATION

-5.0  5.0
ASTIGMATISM

Fig.9D
B=33.9

-5.0(%) 5.0
DISTORTION

Fig.10A
ER=2.7

— d Line
······ g Line
---- C Line

-2.0  2.0
SPHERICAL
ABERRATION
CHROMATIC
ABERRATION

Fig.10B
B=32.7

-0.2  0.2
LATERAL
CHROMATIC
ABERRATION

-5.0  5.0
ASTIGMATISM

Fig.10D
B=32.7

-5.0(%) 5.0
DISTORTION

Fig. 11
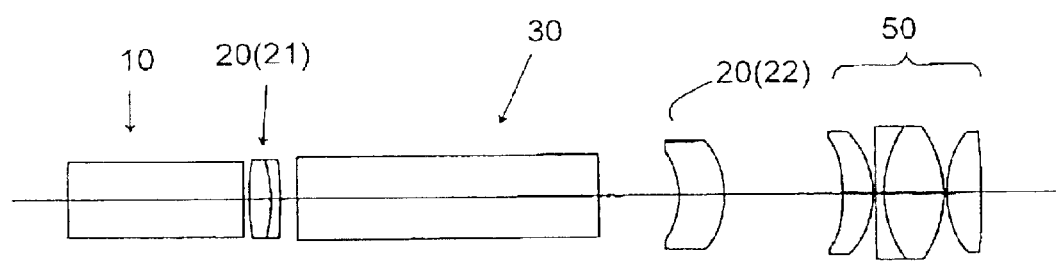
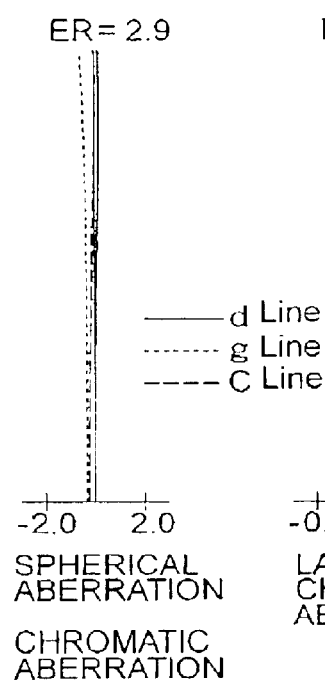
Fig.12A
ER=2.9
SPHERICAL
ABERRATION
CHROMATIC
ABERRATION
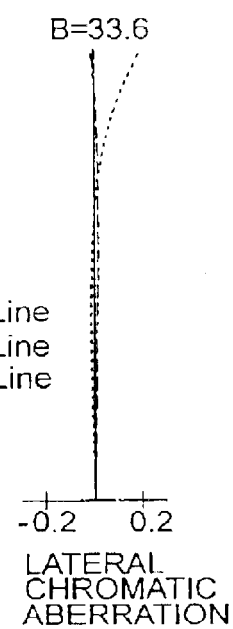
Fig.12B
B=33.6
LATERAL
CHROMATIC
ABERRATION
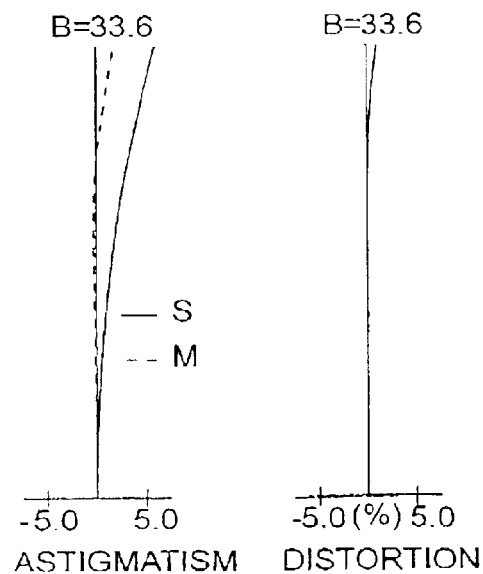
Fig.12C
B=33.6
ASTIGMATISM
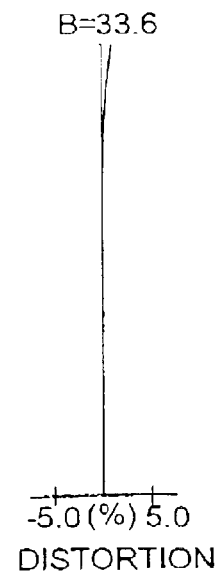
Fig.12D
B=33.6
DISTORTION

ER= 2.6

—— d Line
······· g Line
---- C Line

-2.0  2.0

SPHERICAL
ABERRATION

CHROMATIC
ABERRATION

B=34.1

-0.2  0.2

LATERAL
CHROMATIC
ABERRATION

B=34.1

—— S
-- M

-5.0  5.0

ASTIGMATISM

B=34.1

-5.0 (%) 5.0

DISTORTION

ER= 2.9

── d Line
······ g Line
── ── C Line

SPHERICAL
ABERRATION
CHROMATIC
ABERRATION

B=34.0

LATERAL
CHROMATIC
ABERRATION

B=34.0

── S
── M

ASTIGMATISM

B=34.0

DISTORTION

IMAGE-ERECTING VIEWING OPTICAL SYSTEM

BACKGROUND OF THE INVENTION

1. Field of the Invention

The present invention relates to an image-erecting viewing optical system having a large apparent visual angle and a low magnification.

2. Description of the Prior Art

An image-erecting viewing optical system used in, for example, a binocular or a monocular, generally includes an objective optical system, an image-erecting optical system, and an eyepiece optical system, in this order from the object. In an image-erecting optical system having a wide real field-of-view at a low magnification, there is a need to make the focal length of the objective optical system shorter; however, in an optical arrangement in which the objective optical system is provided in front of the image-erecting optical system, the focal length of the objective optical system has to be made longer by the optical path length of the image-erecting optical system. Consequently, the focal length of the eyepiece optical system has also to be made longer, so that miniaturization of the entire optical system becomes difficult.

SUMMARY OF THE INVENTION

The present invention provides a miniaturized image-erecting optical system having a particularly wide real field-of-view and low magnification.

As an aspect of the present invention, there is provided an image-erecting viewing optical system including a first prism having an incident surface and at least two reflection surfaces, a front lens group of an objective optical system, a second prism having an incident surface and at least two reflection surfaces, a rear lens group of the objective optical system, a field stop, and an eyepiece optical system, in this order from the object. One reflection surface of one of the first prism and second prism includes a roof-mirror surface, and satisfies the following conditions:

$$\sin(\theta-\omega') > 1/n \quad (1)$$

$$6° < \omega < 16° \quad (2)$$

wherein

θ designates an angle between the incident surface and the first reflection surface of the first prism;

ω designates a real field-of-view ω (half amount)

ω' designates an angle between a light ray of a real field-of-view ω (half amount) and the optical axis in the first prism; and n designates the refractive index of the first prism.

On the other hand, in the case where the incident surface and the reflection surface of the first prism are the same surface, the first prism satisfies the following conditions:

$$\sin(2\alpha-\omega') > 1/n \quad (3)$$

$$6° < \omega < 16° \quad (2)$$

wherein

α designates an angle between the incident surface and the first reflection surface of the first prism;

ω designates a real field-of-view ω (half amount);

ω' designates an angle between a light ray of a real field-of-view ω (half amount) and the optical axis in the first prism; and n designates the refractive index of the first prism.

In the above optical arrangement, focusing is performed by moving at least one of the rear lens group of the objective optical system and the eyepiece optical system.

As another aspect of the present invention, there is provided an image-erecting viewing optical system including a first prism, a front lens group of an objective optical system, a second prism, a rear lens group of the objective optical system, a field stop, and an eyepiece optical system, in this order from the object. The image-erecting viewing optical system satisfies the following condition in the case where the rear lens group of the objective optical system is a focusing lens group:

$$0 < f0/f2 < 0.5 \quad (4)$$

wherein f2 designates the focal length of the rear lens group of the objective optical system; and f0 designates the focal length of the entire the objective optical system.

The present disclosure relates to subject matter contained in Japanese Patent Application No. 2001-370584 (filed on Dec. 4, 2001) which is expressly incorporated herein in its entirety.

BRIEF DESCRIPTION OF THE DRAWINGS

The present invention will be discussed below in detail with reference to the accompanying drawings, in which:

FIGS. 9A, 9B, 9C and 9D show aberrations occurred in the lens arrangement shown in FIG. 8, when an object at an infinite distance is in an in-focus state;

FIGS. 10A, 10B, 10C and 10D show aberrations occurred in the lens arrangement shown in FIG. 8, when an object at a distance of 1.2 m is in an in-focus state;

FIG. 11 is a lens arrangement of the image-erecting optical system according to a second numerical embodiment;

FIGS. 12A, 12B, 12C and 12D show aberrations occurred in the lens arrangement shown in FIG. 11, when an object at an infinite distance is in an in-focus state;

DESCRIPTION OF THE PREFERRED EMBODIMENTS

Figure 1:
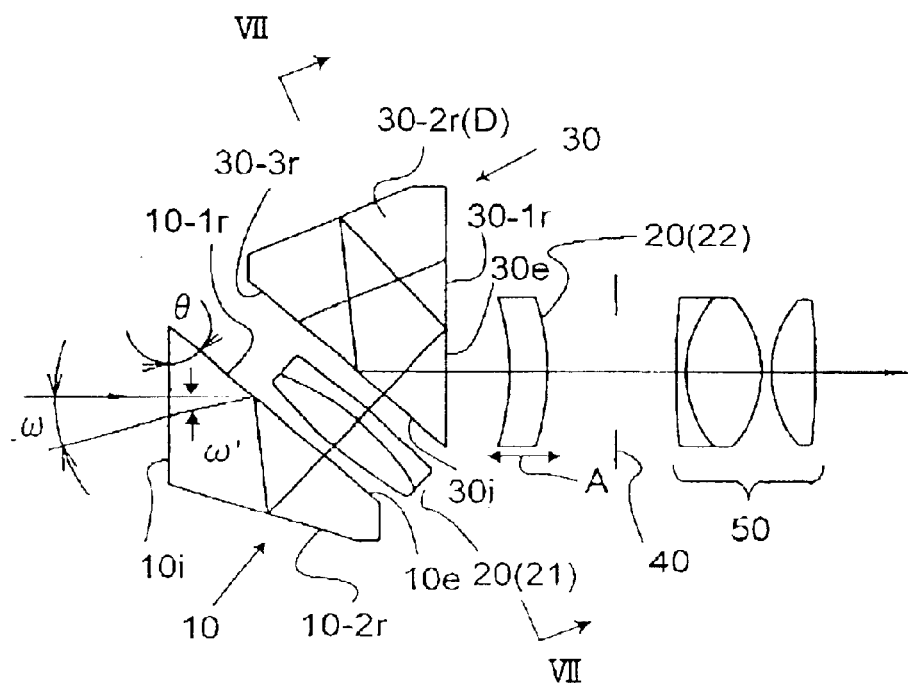
FIG. 1 is an optical structure of an image-erecting optical system according to a first embodiment of the present invention.

FIGS. 1 through 7 show the optical structure of the image-erecting optical system according to the first through sixth embodiments. More specifically, in each of the first through sixth embodiments, the image-erecting optical system includes a first prism 10 (110, 210, 310, 410, 510), a front lens group 21 of an objective optical system 20 (120, 220, 320, 420, 520), a second prism 30 (130, 230, 330, 430, 530), a rear lens group (focusing lens group) 22 of the objective optical system 20 (120, 220, 320, 420, 520), a field stop 40, and an eyepiece optical system 50, in this order from the object.

In the first through sixth embodiments, a reflection surface of either first prism 10 (110, 210, 310, 410, 510) or the second prism 30 (130, 230, 330, 430, 530) is a roof-mirror surface, i.e., either of the first prism 10 or the second prism 30 is a roof prism. Furthermore, in each of the first through sixth embodiments, there are five reflection surfaces, in total, in the first prism 10 (110, 210, 310, 410, 510) and the second prism 30 (130, 230, 330, 430, 530); and one of the five reflection surfaces is a roof-mirror surface. The field stop 40 is provided at a position where an image of an object at infinity is formed through the objective optical system 20 (120, 220, 320, 420, 520).

Specifically, in the first embodiment shown in FIG. 1, the first prism 10 includes an incident surface 10$i$, a first reflection surface 10-1$r$, a second reflection surface 10-2$r$, and an exit surface 10$e$. The second prism 30 includes an incident surface 30$i$, a first reflection surface 30-1$r$, a second reflection surface (roof-mirror surface) 30-2$r$ (D), a third reflection surface 30-3$r$, and an exit surface 30$e$.

The exit surface 10$e$ and the first reflection surface 10-1$r$ are the same surface. The incident surface 30$i$ and the third reflection surface 30-3$r$ are the same surface; and likewise, the first reflection surface 30-1$r$ and the exit surface 30$e$ are the same surface.

Figure 2:
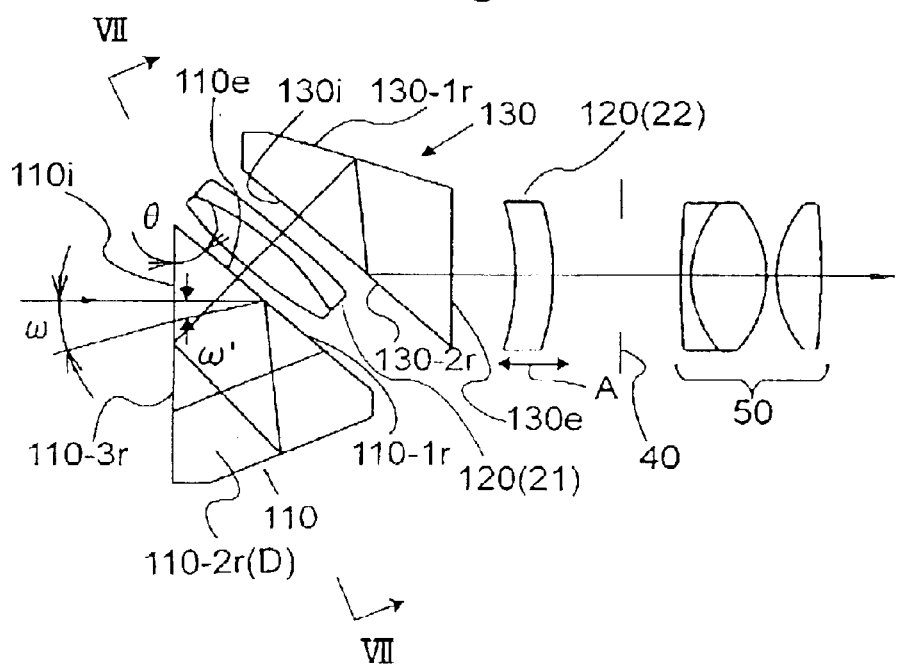
FIG. 2 is an optical structure of the image-erecting optical system according to a second embodiment of the present invention.

In the second embodiment shown in FIG. 2, a first prism 110 includes an incident surface 110$i$, a first reflection surface 110-1$r$, a second reflection surface (roof-mirror surface) 110-2$r$ (D), a third reflection surface 110-3$r$, and an exit surface 110$e$. The second prism 130 includes a incident surface 130$i$, a first reflection surface 130-1$r$, a second reflection surface 130-2$r$, and an exit surface 130$e$.

The incident surface 110$i$ and the third reflection surface 110-3$r$ are the same surface; and the exit surface 110$e$ and the first reflection surface 110-1$r$ are the same surface. Likewise, the incident surface 130$i$ and the second reflection surface 130-2$r$ are the same surface.

Figure 3:
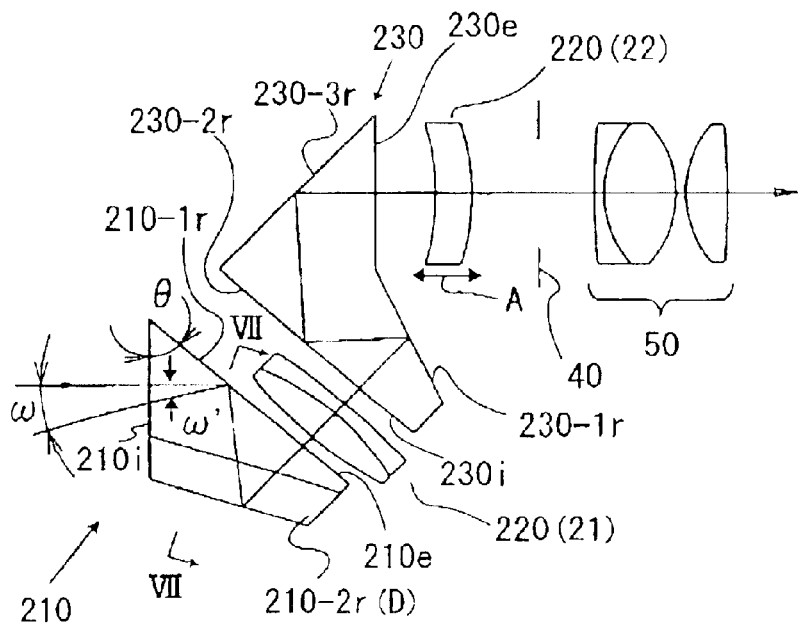
FIG. 3 is an optical structure of the image-erecting optical system according to a third embodiment of the present invention.

In the third embodiment shown in FIG. 3, a first prism 210 includes an incident surface 210$i$, a first reflection surface 210-1$r$, a second reflection surface (roof-mirror surface) 210-2$r$ (D), and an exit surface 210$e$. A second prism 230 includes an incident surface 230$i$, a first reflection surface 230-1$r$, a second reflection surface 230-2$r$, a third reflection surface 230-3$r$, and an exit surface 230$e$.

The first reflection surface 210-1$r$ and the exit surface 210$e$ are the same surface; and the incident surface 230$i$ and the second reflection surface 230-2$r$ are the same surface.

Figure 4:
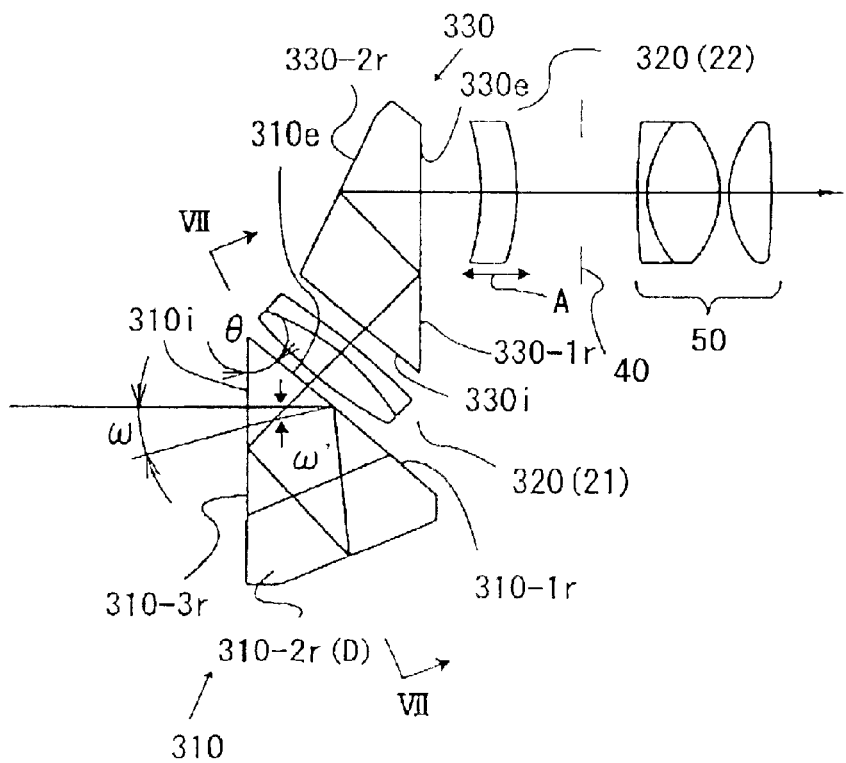
FIG. 4 is an optical structure of the image-erecting optical system according to a fourth embodiment of the present invention.

In the fourth embodiment shown in FIG. 4, a first prism 310 includes an incident surface 310$i$, a first reflection surface 310-1$r$, a second reflection surface (roof-mirror surface) 310-2$r$ (D), a third reflection surface 310-3$r$, and an exit surface 310$e$. A second prism 330 includes an incident surface 330$i$, a first reflection surface 330-1$r$, a second reflection surface 330-2$r$, and an exit surface 330$e$.

The incident surface 310$i$ and the third reflection surface 310-3$r$ are the same surface; and the first reflection surface 310-1$r$ and the exit surface 310$e$ are the same surface.

Figure 5:
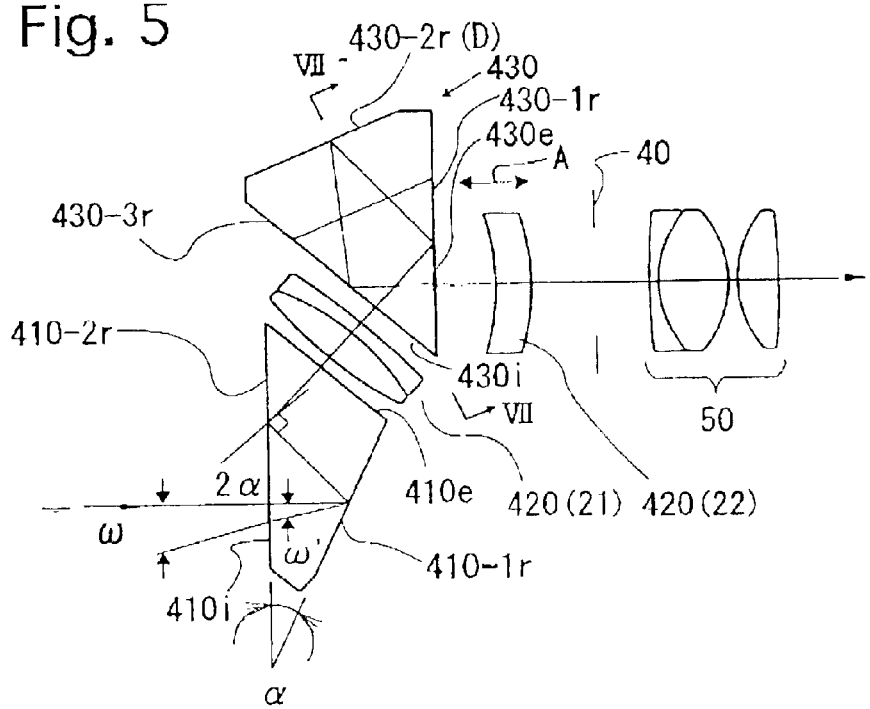
FIG. 5 is an optical structure of the image-erecting optical system according to a fifth embodiment of the present invention.

In the fifth embodiment shown in FIG. 5, a first prism 410 includes an incident surface 410$i$, a first reflection surface 410-1$r$, a second reflection surface 410-2$r$, and an exit surface 410$e$. A second prism 430 includes an incident surface 430$i$, a first reflection surface 430-1$r$, a second reflection surface (roof-mirror surface) 430-2$r$ (D), a third reflection surface 430-3$r$, and an exit surface 430$e$.

The incident surface 410$i$ and the second reflection surface 410-2$r$ are the same surface. The incident surface 430$i$ and the third reflection surface 430-3$r$ are the same surface. The first reflection surface 430-1$r$ and the exit surface 430$e$ are the same surface.

Figure 6:
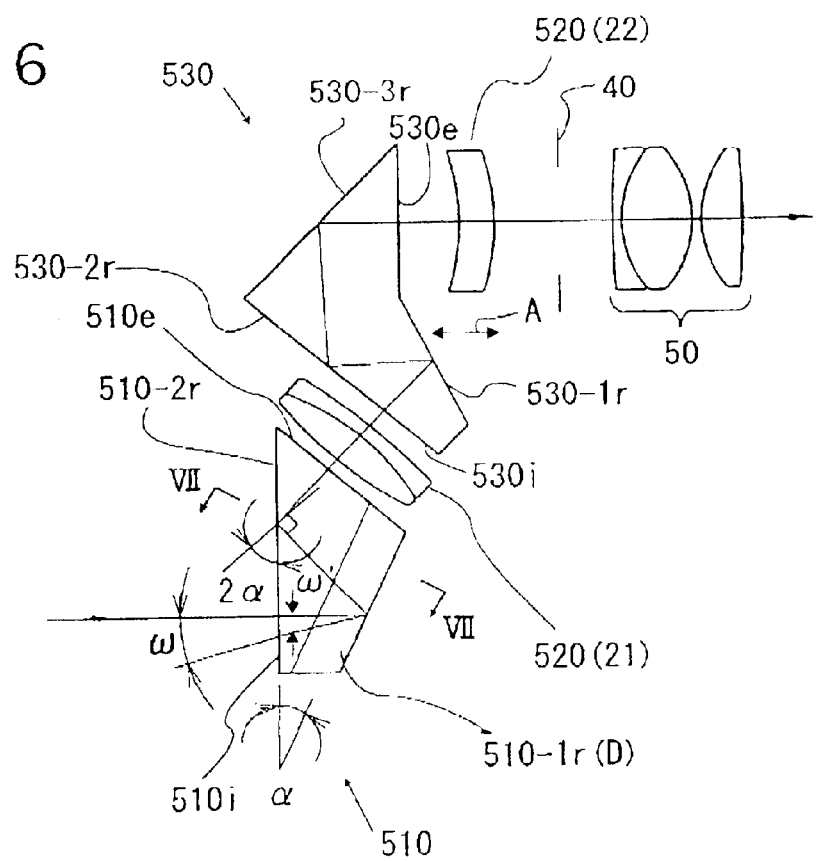
FIG. 6 is an optical structure of the image-erecting optical system according to a sixth embodiment of the present invention.
Figure 7:
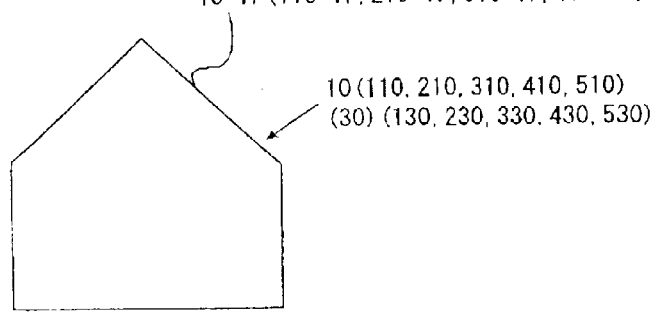
FIG. 7 is a sectional view along the arrows VII—VII shown in FIGS. 1, 2, 3, 4, 5 and 6.

In the sixth embodiment shown in FIG. 6, a first prism 510 includes an incident surface 510$i$, a first reflection surface (roof-mirror surface) 510-1$r$ (D), a second reflection surface 510-2$r$, and an exit surface 510$e$. A second prism 530 includes an incident surface 530$i$, a first reflection surface 530-1$r$, a second reflection surface 530-2$r$, a third reflection surface 530-3$r$, and an exit surface 530$e$.

The incident surface 510$i$ and the second reflection surface 510-2$r$ are the same surface. The incident surface 530$i$ and the second reflection surface 530-2$r$ are the same surface.

In each of the first through sixth embodiments, the incident surfaces and the exit surfaces extend perpendicularly to the page on which FIGS. 1 through 6 are shown; and likewise, the reflection surfaces other than the roof-mirror surfaces extend perpendicularly to the page on which FIGS. 1 through 6 are shown.

The first through sixth embodiments can be divided into two groups, i.e., (i) a first group: the first through fourth embodiments shown in FIGS. 1 through 4; and (ii) a second group: the fifth and sixth embodiments shown in FIGS. 5 and 6.

The first group, i.e., the first through fourth embodiments, satisfies the following conditions:

$\sin(\theta-\omega')>1/n$ (1)

$6°<\omega<16°$ (2)

wherein $\theta$ designates an angle between the incident surface and the first reflection surface of the first prism;

$\omega$ designates a real field-of-view $\omega$ (half amount);

$\omega'$ designates an angle between a light ray of the real field-of-view $\omega$ (half amount) and the optical axis in the first prism; and n designates the refractive index of the first prism.

By satisfying conditions (1) and (2), light rays do not pass through the reflection surfaces in the first prism, so that reduction of peripheral illumination at the peripheral area of the view field, and ghosting caused by transmitting light rays can be avoided.

In the second group, i.e., the fifth and sixth embodiments, the incident surface 410i (510i) and the second reflections surface 410-2r (510-2r) of the first prism 410 (510) are the same surface, and the first prism 410 (510) satisfies the following conditions:

$$\sin(2\alpha - \omega') > 1/n \quad (3)$$

$$6° < \omega < 16° \quad (2)$$

wherein

α designates an angle between the incident surface and the first reflection surface of the first prism;

ω designates a real field-of-view ω (half amount);

ω' designates an angle between a light ray of a real field-of-view ω (half amount) and the optical axis in the first prism; and n designates the refractive index of the first prism.

By satisfying conditions (3) and (2), light rays do not pass through the reflection surfaces in the first prism, so that reduction of peripheral illumination at the peripheral area of the view field, and ghosting caused by transmitting light rays can be avoided.

In the above-described embodiments, focusing is carried out by moving the rear lens group 22 of the objective optical system 20 (120, 220, 320, 420, 520) in a forward or rearward direction along the optical axis. Alternatively, the eyepiece optical system can be used as a focusing lens group.

According to such an internal-focusing arrangement, no movable members are exposed to outside, so that strength of a lens-frame structure can be increased with ease; and the volume of a member in which the image-erecting viewing optical system is contained does not vary, so that a waterproof structure can be easily achieved.

Furthermore, in the objective optical system 20 (120, 220, 320, 420, 520) including the front lens group 21 and the rear lens group 22, it is preferable that the rear lens group 22 have a weak optical power for the purpose of reducing fluctuations of aberrations.

Condition (4) specifies the power of both the front lens group 21 and the rear lens group 22.

If fO/f2 exceeds the lower limit of condition (4), the traveling distance of the rear lens group 22 upon focusing becomes longer, so that the size of the optical system increases in order to secure enough space to cover the traveling distance of the rear lens group 22.

If fO/f2 exceeds the upper limit of condition (4), it becomes difficult to correct the change in aberrations upon focusing, and especially difficult to correct field curvature.

Specific numerical data of the embodiments will be described hereinafter. In the diagrams of chromatic aberration (on-axis chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, a line as the base line coincides with the ordinate. Furthermore, S designates the sagittal image, and M designates the meridional image; ER designates the diameter of the exit pupil, and B designates the apparent visual angle (°). In the tables, r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

x designates an amount of change in the optical axis direction with respect to the distance "y" from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Numerical Embodiment 1]

Figure 8:
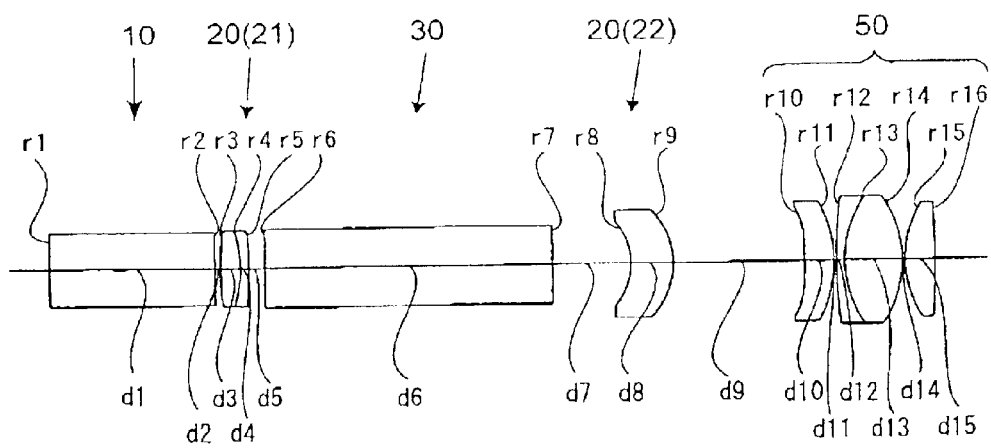
FIG. 8 is a lens arrangement of the image-erecting optical system according to a first numerical embodiment.
Figure 13A:
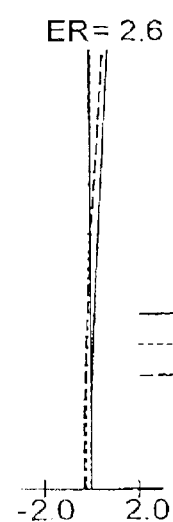
FIGS. 13A, 13B, 13C and 13D show aberrations occurred in the lens arrangement shown in FIG. 11, when an object at a distance of 1.5 m is in an in-focus state.
Figure 13B:
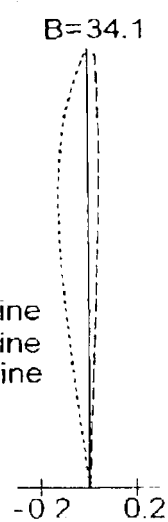
Figure 13C:
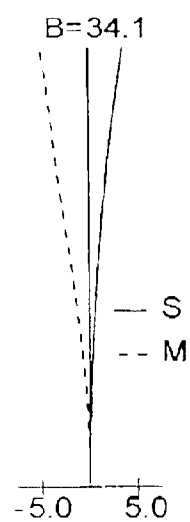
Figure 13D:
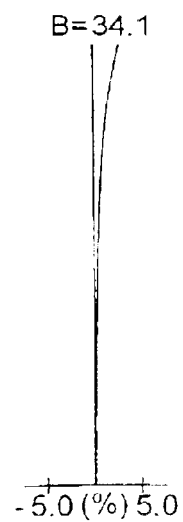

FIGS. 8 through 10D show the image-erecting optical system according to the first numerical embodiment of the present invention. FIG. 8 is a lens arrangement of the first numerical embodiment. FIGS. 9A through 9D show aberrations occurred in the lens arrangement shown in FIG. 8, when an object at an infinite distance is in an in-focus state. FIGS. 10A through 10D show aberrations occurred in the lens arrangement shown in FIG. 8, when an object at a distance of 1.2 m is in an in-focus state. Table 1 shows the numerical data of the first numerical embodiment. D7 (14.94;26.89) designates the distance d7 (FIG. 8) between the most object-side surface of the rear lens group 22 and the exit surface of the second prism 30, when an object at an infinite distance is in an in-focus state, and when an object at a distance of 1.2 m is in an in-focus state. D9 (24.80; 12.85) designates the distance d9 (FIG. 8) between the most image-side surface of the rear lens group 22 and the most object-side surface of the eyepiece optical system 50, when an object at an infinite distance is in an in-focus state, and when an object at a distance of 1.2 m is in an in-focus state.

TABLE 1

| Surface No. | r | d | Nd | ν |
|---|---|---|---|---|
| 1 | ∞ | 31.28 | 1.56883 | 56.3 |
| 2 | ∞ | 1.00 | — | — |
| 3 | 59.264 | 3.87 | 1.51633 | 64.1 |
| 4 | −26.478 | 1.60 | 1.62004 | 36.3 |
| 5 | −67.614 | 3.00 | — | — |
| 6 | ∞ | 54.21 | 1.51633 | 64.1 |
| 7 | ∞ | D7 | — | — |
| 8 | −14.300 | 8.00 | 1.78472 | 25.7 |
| 9 | −16.720 | D9 | — | — |
| 10* | −250.000 | 5.50 | 1.49176 | 57.4 |
| 11 | −27.363 | 0.50 | — | — |
| 12 | 116.372 | 1.50 | 1.84666 | 23.8 |
| 13 | 24.611 | 10.96 | 1.58913 | 61.2 |
| 14 | −24.611 | 0.50 | — | — |
| 15 | 23.839 | 5.61 | 1.58913 | 61.2 |
| 16 | −150.000 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 10 | 0.00 | $-0.81400 \times 10^{-4}$ | $-0.25300 \times 10^{-6}$ | $0.11400 \times 10^{-8}$ |
| $\omega = 8°$ | | | | |
| D7 = 14.94 | | 26.89 | | |
| D9 = 24.80 | | 12.85 | | |

[Numerical Embodiment 2]

FIGS. 11 through 13D show the image-erecting optical system according to the second numerical embodiment of the present invention. FIG. 11 is a lens arrangement of the second numerical embodiment. FIGS. 12A through 12D show aberrations occurred in the lens arrangement shown in FIG. 11, when an object at an infinite distance is in an in-focus state. FIGS. 13A through 13D show aberrations occurred in the lens arrangement shown in FIG. 11, when an object at a distance of 1.5 m is in an in-focus state. Table 2 shows the numerical data of the second numerical embodiment. D7 (14.18; 27.10) designates the distance d7 (FIG. 8) between the most object-side surface of the rear lens group 22 and the exit surface of the second prism 30, when an object at an infinite distance is in an in-focus state, and when an object at a distance of 1.5 m is in an in-focus state. D9 (20.95; 8.03) designates the distance d9 (FIG. 8) between the most image-side surface of the rear lens group 22 and the most object-side surface of the eyepiece optical system 50, when an object at an infinite distance is in an in-focus state, and when an object at a distance of 1.5 m is in an in-focus state.

TABLE 2

| Surface No. | r | d | Nd | ν |
|---|---|---|---|---|
| 1 | ∞ | 31.28 | 1.56883 | 56.3 |
| 2 | ∞ | 1.00 | — | — |
| 3 | 47.000 | 3.87 | 1.51633 | 64.1 |
| 4 | −29.750 | 1.60 | 1.62004 | 36.3 |
| 5 | −92.300 | 3.00 | — | — |
| 6 | ∞ | 54.21 | 1.51633 | 64.1 |
| 7 | ∞ | D7 | — | — |
| 8 | −16.408 | 8.00 | 1.78472 | 25.7 |
| 9 | −18.244 | D9 | — | — |
| 10* | −60.000 | 5.50 | 1.49176 | 57.4 |
| 11 | −18.140 | 0.50 | — | — |
| 12 | ∞ | 1.50 | 1.84666 | 23.8 |
| 13 | 24.140 | 10.70 | 1.58913 | 61.2 |
| 14 | −24.140 | 0.50 | — | — |
| 15 | 20.388 | 6.25 | 1.58913 | 61.2 |
| 16 | −150.000 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 |
|---|---|---|---|
| 10 | 0.00 | $-0.12800 \times 10^{-3}$ | $0.13000 \times 10^{-6}$ |
| $\omega = 8°$ | | | |
| D7 = 14.18 | | 27.10 | |
| D9 = 20.95 | | 8.03 | |

[Numerical Embodiment 3]

Figure 14:
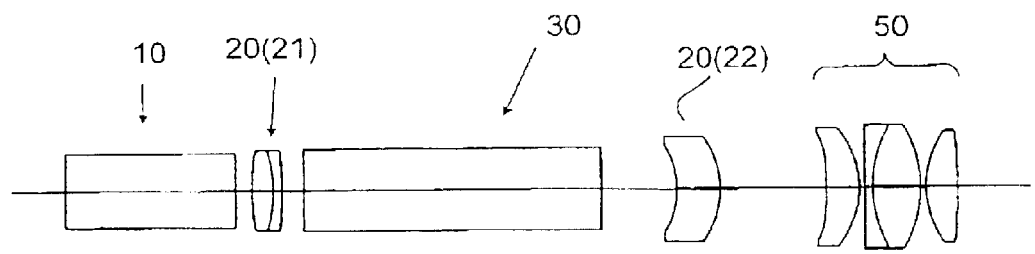
FIG. 14 is a lens arrangement of the image-erecting optical system according to a third numerical embodiment.
Figure 15A:
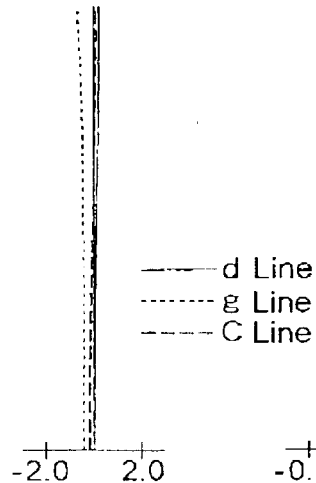
FIGS. 15A, 15B, 15C and 15D show aberrations occurred in the lens arrangement shown in FIG. 14, when an object at an infinite distance is in an in-focus state.
Figure 15B:
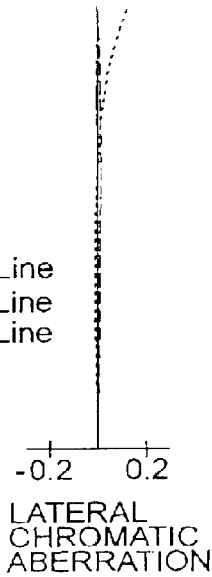
Figure 15C:
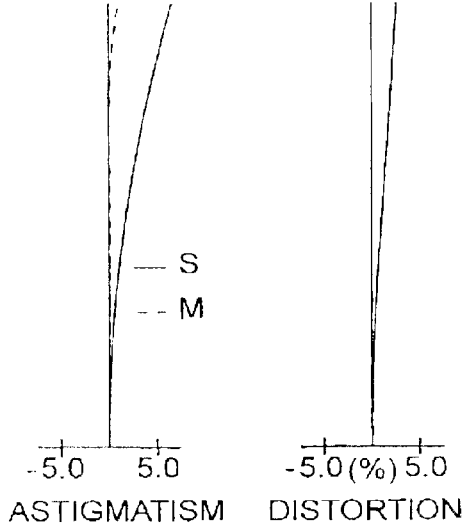
Figure 15D:
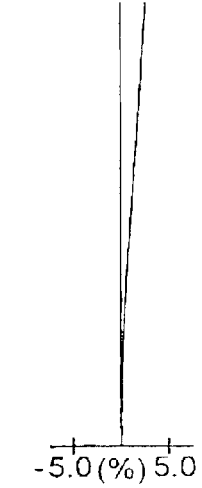
Figure 16A:
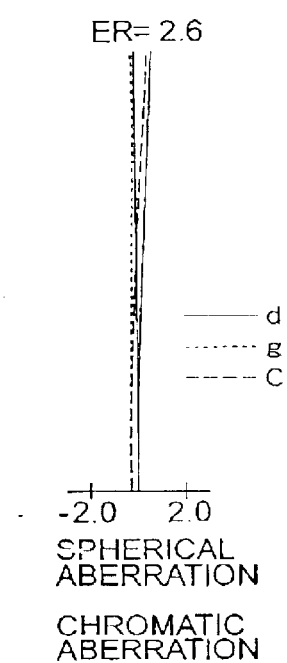
FIGS. 16A, 16B, 16c and 16D show aberrations occurred in the lens arrangement shown in FIG. 14, when an object at a distance of 1.5 m is in an in-focus state.
Figure 16B:
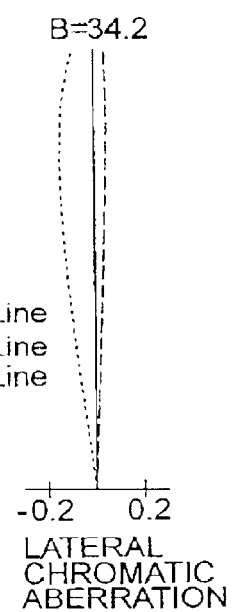
Figure 16C:
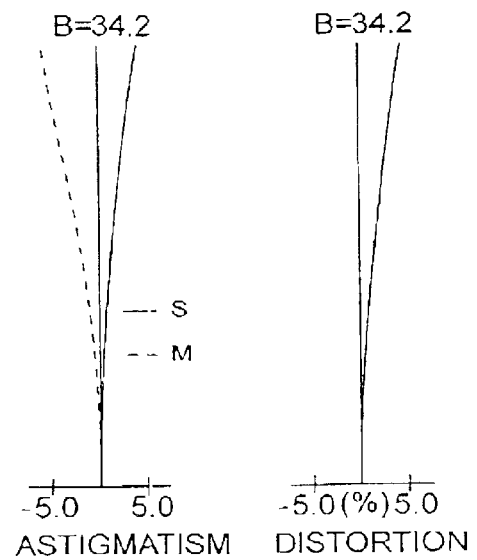
Figure 16D:
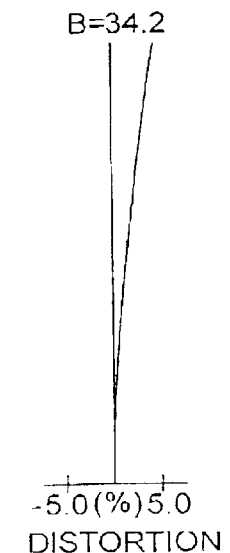

FIGS. 14 through 16 D show a third numerical embodiment of an image-erecting optical system according to the present invention FIG. 14 is a lens arrangement of the third numerical embodiment. FIGS. 15A through 15D show aberrations occurred in the lens arrangement shown in FIG. 14, when an object at an infinite distance is in an in-focus state. FIGS. 16A through 16D show aberrations occurred in the lens arrangement shown in FIG. 14, when an object at a distance of 1.5 m is in an in-focus state.

Table 3 shows the numerical data of the third numerical embodiment. D7 (13.89; 27.21) designates the distance d7 (FIG. 8) between the most object-side surface of the rear lens group 22 and the exit surface of the second prism 30, when an object at an infinite distance is in an in-focus state, and when an object at a distance of 1.5 m is in an in-focus state. D9 (19.48; 6.16) designates the distance d9 (FIG. 8) between the most image-side surface of the rear lens group 22 and the most object-side surface of the eyepiece optical system 50, when an object at an infinite distance is in an in-focus state, and when an object at a distance of 1.5 m is in an in-focus state.

TABLE 3

| Surface No. | r | d | Nd | ν |
|---|---|---|---|---|
| 1 | ∞ | 31.28 | 1.56883 | 56.3 |
| 2 | ∞ | 3.00 | — | — |
| 3 | 48.796 | 3.87 | 1.51633 | 64.1 |
| 4 | −28.615 | 1.60 | 1.62004 | 36.3 |
| 5 | −84.842 | 4.00 | — | — |
| 6 | ∞ | 54.21 | 1.51633 | 64.1 |
| 7 | ∞ | D7 | — | — |
| 8 | −17.193 | 8.00 | 1.78472 | 25.7 |
| 9 | −18.658 | D9 | — | — |
| 10* | −120.000 | 6.00 | 1.49176 | 57.4 |
| 11 | −19.212 | 0.96 | — | — |
| 12 | ∞ | 1.50 | 1.84666 | 23.8 |
| 13 | 25.307 | 8.70 | 1.58913 | 61.2 |
| 14 | −25.307 | 1.04 | — | — |
| 15 | 20.414 | 5.80 | 1.58913 | 61.2 |
| 16 | −100.000 | — | — | — |

*designates the aspherical surface which is rotationally symmetrical with respect to the optical axis.

Aspherical surface data (the aspherical surface coefficients not indicated are zero (0.00)):

| Surf.No. | K | A4 |
|---|---|---|
| 10 | 0.00 | $-0.94605 \times 10^{-4}$ |
| $\omega = 8°$ | | |
| D7 = 13.89 | | 27.21 |
| D9 = 19.48 | | 6.16 |

Table 4 shows the numerical values of each condition for each numerical embodiment.

TABLE 4

| | Num.Embod.1 | Num.Embod.2 | Num.Embod.3 |
|---|---|---|---|
| Cond. (1) | θ = 48 | θ = 48 | θ = 48 (Embods.1~4) |
| Cond. (2) | ω = 8.0 | ω = 8.0 | ω = 8.0 |
| Cond. (3) | α = 24 | α = 24 | α = 24 (Embods.5~6) |
| Cond. (4) | 0.31 | 0.36 | 0.40 |

According to the above description, a miniaturized image-erecting optical system having a wide field-of-view and a low magnification can be achieved.

What is claimed is:

1. An image-erecting viewing optical system comprising a first prism having an incident surface and at least two reflection surfaces, a front lens group of an objective optical system, a second prism having an incident surface and at least two reflection surfaces, a rear lens group of said objective optical system, a field stop, and an eyepiece optical system, in this order from an object, wherein one reflection surface of one of said first prism and second prism comprises a roof-mirror surface; and wherein said first prism satisfies the following conditions:

$$\sin(\theta-\omega')>1/n$$

$$6°<\omega<16°$$

wherein

θ designates an angle between said incident surface and a first reflection surface of said first prism;

ω designates a real field-of-view ω (half amount);

ω' designates an angle between a light ray of a real field-of-view ω (half amount) and the optical axis in said first prism; and n designates the refractive index of said first prism.

2. An image-erecting viewing optical system according to claim 1, wherein at least one of said rear lens group of said objective optical system and said eyepiece optical system comprises a focusing lens group.

* * * * *